(12) United States Patent
Huang et al.

(10) Patent No.: US 11,946,591 B2
(45) Date of Patent: Apr. 2, 2024

(54) FOLDABLE STAND

(71) Applicant: RELIANCE INTERNATIONAL CORP., Taipei (TW)

(72) Inventors: Chi-Chia Huang, Taipei (TW);
Cheng-Lin Ho, Taipei (TW); Eric Langenhahn, Taipei (TW)

(73) Assignee: Reliance International Corp., Taipei (TW)

( * ) Notice: Subject to any disclaimer, the term of this patent is extended or adjusted under 35 U.S.C. 154(b) by 0 days.

(21) Appl. No.: 17/652,171

(22) Filed: Feb. 23, 2022

(65) Prior Publication Data
US 2023/0235848 A1    Jul. 27, 2023

(30) Foreign Application Priority Data

Jan. 26, 2022   (CN) .......................... 202210093135.1

(51) Int. Cl.
*F16M 11/38*    (2006.01)
*H04R 1/08*     (2006.01)

(52) U.S. Cl.
CPC ............... *F16M 11/38* (2013.01); *H04R 1/08* (2013.01); *F16M 2200/021* (2013.01)

(58) Field of Classification Search
CPC ............. F16M 11/38; F16M 2200/021; F16M 11/2021; F16M 2200/08; H04R 1/08
See application file for complete search history.

(56) References Cited

U.S. PATENT DOCUMENTS

| 3,599,924 | A | * | 8/1971 | Schmidgall | ............. | E01F 9/688 |
| | | | | | | 248/158 |
| 4,718,624 | A | * | 1/1988 | Greulich | .................. | H04R 1/08 |
| | | | | | | 248/291.1 |
| 5,048,789 | A | * | 9/1991 | Eason | .................... | F16M 11/10 |
| | | | | | | 248/188.7 |
| D326,969 | S | * | 6/1992 | Eason | .......................... | D24/128 |

(Continued)

FOREIGN PATENT DOCUMENTS

CN   201114679 Y  *  9/2008
KR   940002988 Y1 *  6/1993

OTHER PUBLICATIONS

On-Stage SMS7630B Hex Base Studio microphone stand sold on amazon.com dated Mar. 22, 2010, https://www.amazon.com/Stage-SMS7630B-Base-Studio-Stnd/dp/B003DKVNIW (Year: 2010).*

(Continued)

*Primary Examiner* — Terrell L McKinnon
*Assistant Examiner* — Ding Y Tan
(74) *Attorney, Agent, or Firm* — Rosenberg, Klein & Lee

(57) ABSTRACT

A foldable stand has a base, a riser, and a switching mechanism. The riser is located on the base. The switching mechanism connects the base and the riser such that the riser selectively pivots relative to the base from an upright position to a folded position. The switching mechanism has a locked status and a released status. In the locked status, the switching mechanism prevents the riser from pivoting relative to the base. In the released status, the switching mechanism allows the riser to pivot relative to the base from an upright position to a folded position. The switching mechanism is configured to be switched from the locked status to the released status by rotation of the riser around a centerline of the riser.

12 Claims, 14 Drawing Sheets

(56) References Cited

U.S. PATENT DOCUMENTS

| | | | | |
|---|---|---|---|---|
| 5,497,965 | A | * | 3/1996 | Mathieu, Jr. ......... F16M 11/041 403/327 |
| 5,893,541 | A | * | 4/1999 | Michaelson ......... F16M 11/041 248/161 |
| 6,007,032 | A | * | 12/1999 | Kuo ....................... F16M 11/16 248/188.7 |
| 6,612,534 | B2 | * | 9/2003 | Hennessey ............. F16M 11/16 248/161 |
| D743,951 | S | * | 11/2015 | Slaton ......................... D14/229 |
| 2002/0175261 | A1 | * | 11/2002 | Hennessey ............. F16M 11/16 248/519 |
| 2006/0013427 | A1 | * | 1/2006 | Workman ................ H04R 1/08 381/361 |
| 2012/0080577 | A1 | * | 4/2012 | McIntyre ............... F16M 11/04 248/346.03 |
| 2012/0104730 | A1 | * | 5/2012 | Goldszer .................. B62B 1/12 280/651 |

OTHER PUBLICATIONS

Atlas sound MS25 mic stand sold on amazon dated Apr. 13, 2004, https://www.amazon.com/Atlas-Sound-MS25-Chrome/dp/B000IZ8UBS (Year: 2004).*

On Stage SMS7630B hex base studio stand sold on amazon.com, dated Mar. 22, 2010, https://www.amazon.com/Stage-SMS7630B-Base-Studio-Stnd/dp/B003DKVNIW (Year: 2010).*

* cited by examiner

FOLDABLE STAND

BACKGROUND OF THE INVENTION

1. Field of the Invention

The present invention relates to a stand on which an external object may be fixed, especially to a microphone stand.

2. Description of the Prior Arts

A microphone stand has a base that is wide and heavy to prevent the microphone stand from tipping over easily. However, it is difficult to store the microphone stand because the base occupies a lot of floor area. Although the microphone stand can be stored sideways to reduce amount of floor area required for storage, length of the microphone stand makes it difficult to place the stand on a shelf. Moreover, center of gravity of the microphone stand is located on an end where the base is, making it difficult to maneuver the stand when disposed sideways. As a result, the conventional microphone stand can only be put on the ground when stored sideways, making it difficult for storage and vulnerable to cosmetic damage.

To overcome the shortcomings, the present invention provides a foldable stand to mitigate or obviate the aforementioned problems.

SUMMARY OF THE INVENTION

The main objective of the present invention is to provide a foldable stand having a base and a riser that are pivotal toward each other to save storage space and facilitate ease of storage.

The foldable stand has a base, a riser, and a switching mechanism. The riser is located on the base. The switching mechanism connects the base and the riser such that the riser selectively pivots relative to the base from an upright position to a folded position. The switching mechanism has a locked status and a released status. In the locked status, the switching mechanism prevents the riser from pivoting relative to the base. In the released status, the switching mechanism allows the riser to pivot relative to the base from an upright position to a folded position. The switching mechanism is configured to be switched from the locked status to the released status by rotation of the riser around a centerline of the riser and linear motion of the riser along the centerline of the riser.

The present invention has the following advantages.

First, the foldable stand can be folded up by pivoting the riser toward the base, significantly reducing floor space required for storage. As a result, the foldable stand is convenient for storage.

Second, the switching mechanism needs to be unlocked before pivoting the riser, preventing the riser from accidentally pivoting toward the base. To be precise, a user needs to rotate the riser to switch the switching mechanism from the locked status to the released status before pivoting the riser.

Third, the switching mechanism is switched by rotating the riser, meaning the user does not have to squat down to operate the switching mechanism. As a result, the foldable stand is easy to use.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1, 2, 5, and 14, a foldable stand in accordance with the present invention comprises a base 10, a riser 20, and a switching mechanism 30. The foldable stand is preferably a microphone stand.

The base 10 is configured for being put on the ground. A side-standing portion 11 is disposed on a side of the base. The riser 20 is located on the base 10.

Figure 5:
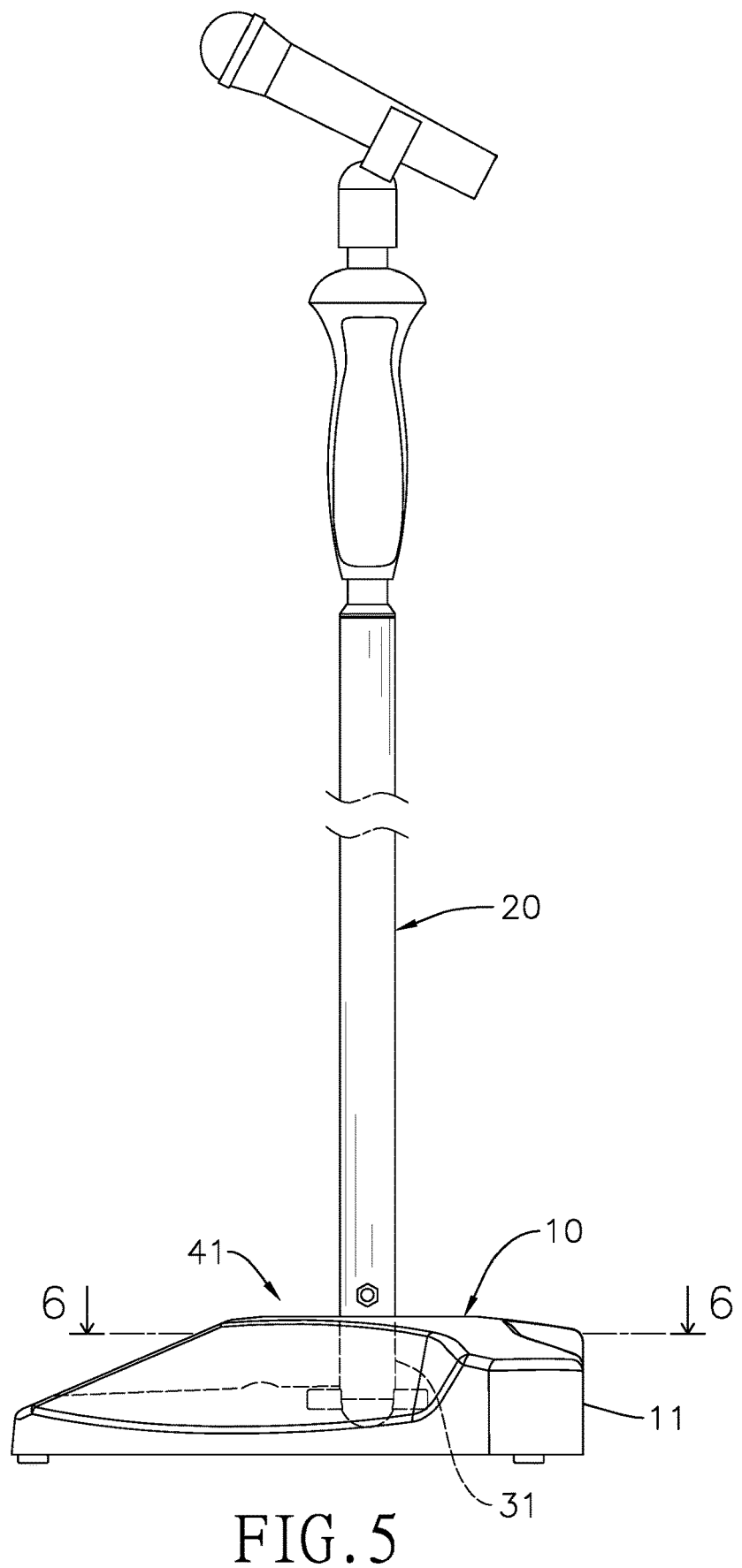
FIG. 5 is a side view of part of the foldable stand, showing a riser in an upright position.

The switching mechanism 30 connects the base 10 and the riser 20. The switching mechanism 30 has a locked status and a released status. In the locked status, the switching mechanism 30 prevents the riser 20 from pivoting relative to the base 10. To be precise, in the locked status, the riser 20 is fixed in an upright position (as shown in FIG. 5) by the switching mechanism 30. The riser 20 is substantially perpendicular to the base 10 in the upright position, making the foldable stand suitable for use as a microphone stand.

Figure 14:
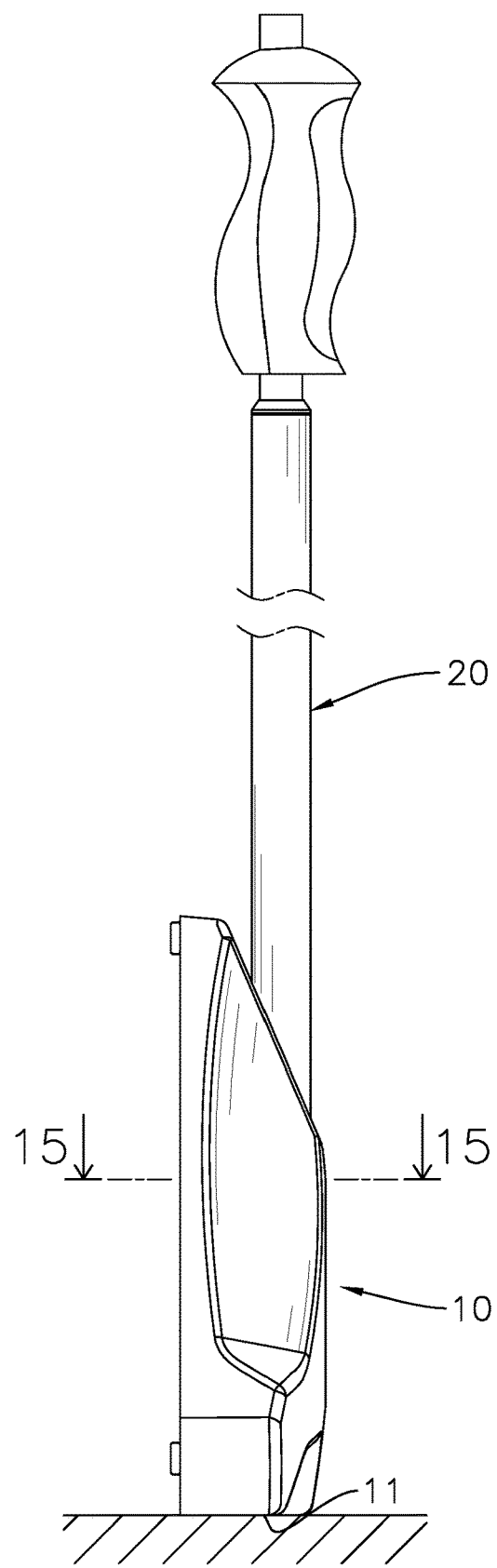
FIG. 14 is another side view of the foldable stand, showing the riser being in a folded position, and the foldable stand standing on the ground with only a side-standing portion contacting the ground.

In the released status, the switching mechanism 30 allows the riser 20 to pivot relative to the base 10 from the upright position to a folded position (as shown in FIG. 14). In the folded position, the riser 20 and the base 10 are substantially in a same plane for ease of storage.

The switching mechanism 30 is switched between the locked status and the released status by rotation of the riser 20 around the centerline of the riser 20 and linear motion of the riser 20 along the centerline of the riser 20. In the preferred embodiment, the switching mechanism 30 allows the riser 20 to pivot relative to the base 10 for more than 80 degrees to the folded position, but a pivot angle of the riser 20 relative to the base 10 is not limited thereto.

Figure 1:
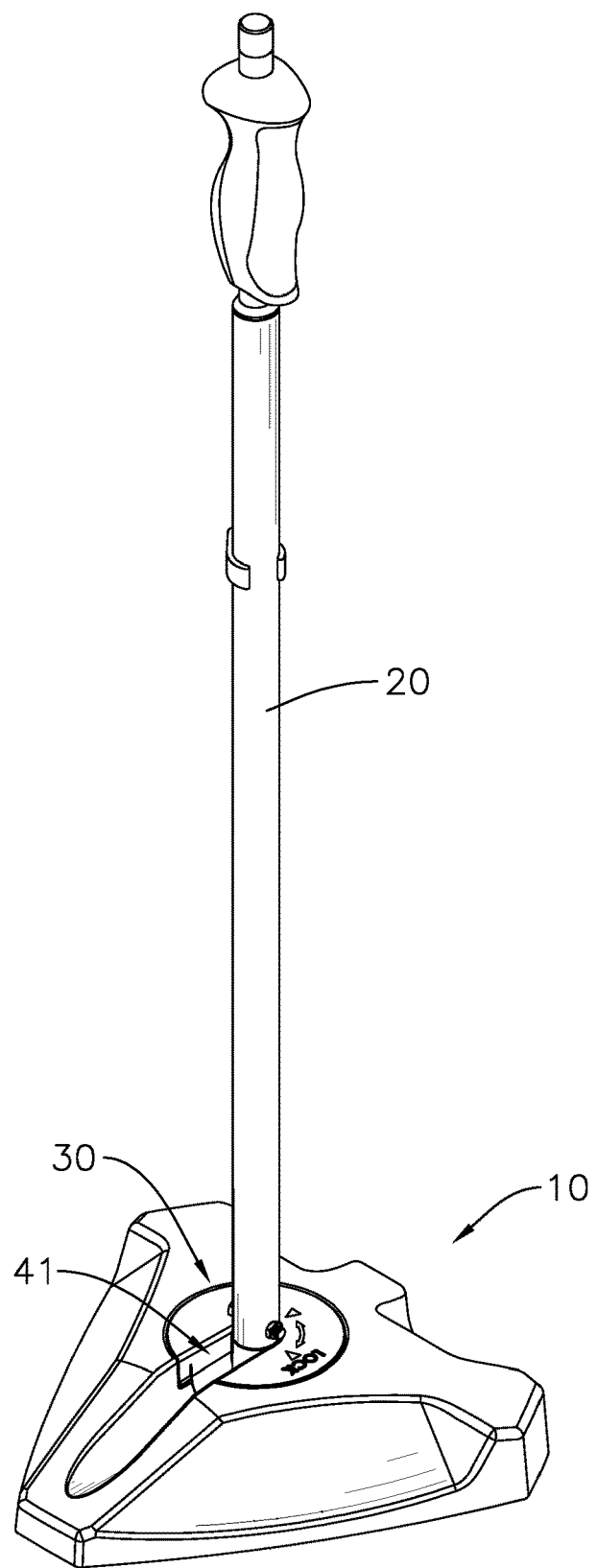
FIG. 1 is a perspective view of a foldable stand in accordance with the present invention.
Figure 2:
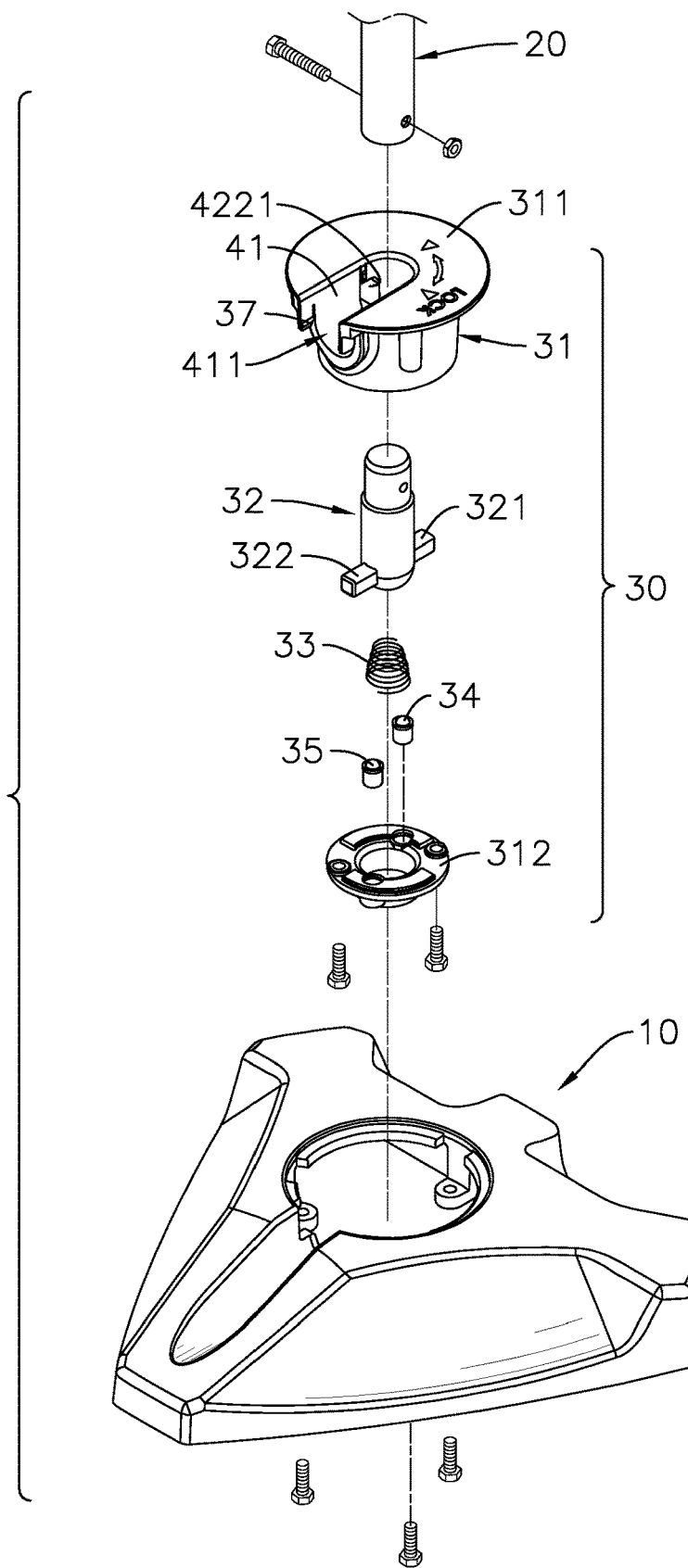
FIG. 2 is an enlarged exploded perspective view of the foldable stand in FIG. 1.
Figure 3:
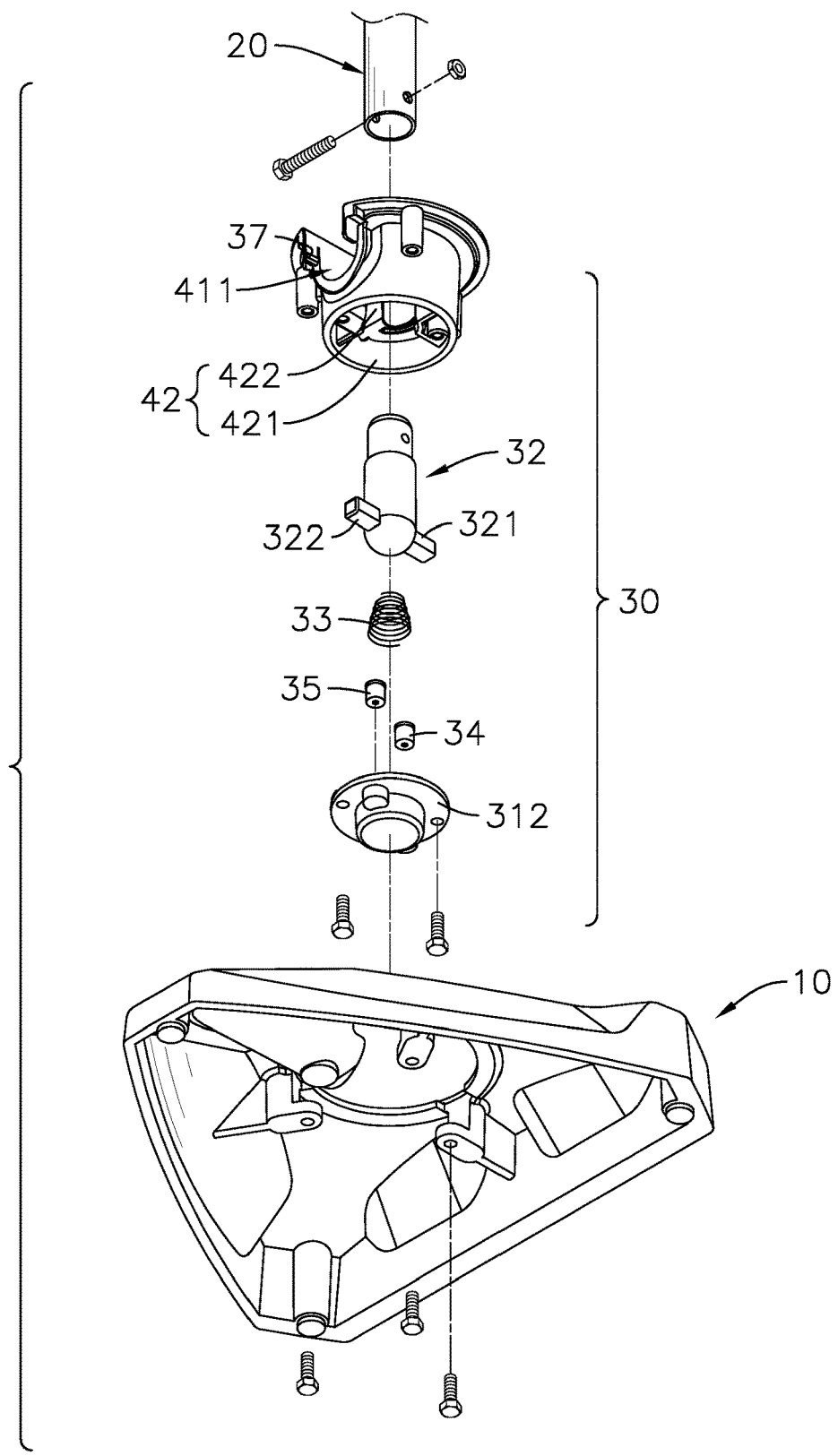
FIG. 3 is another enlarged exploded perspective view of the foldable stand in FIG. 1.
Figure 4:
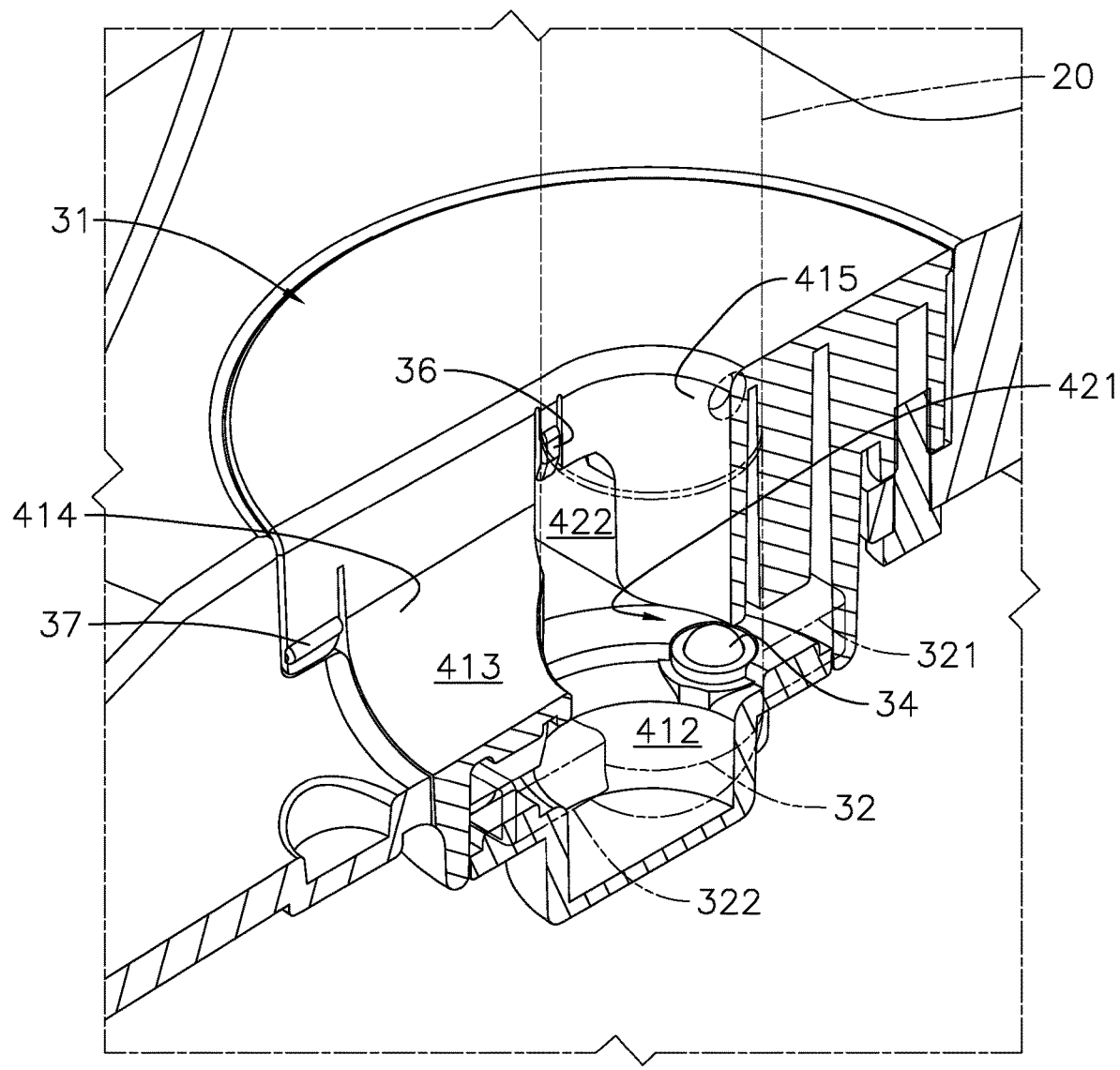
FIG. 4 is a cutaway perspective view of part of the foldable stand in FIG. 1.
Figure 8:
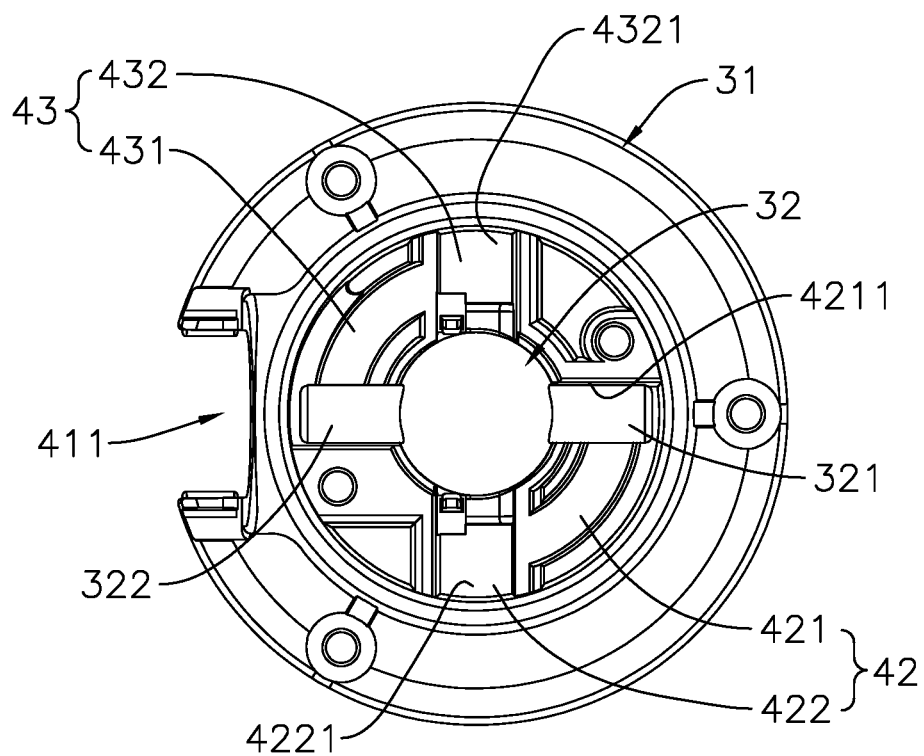
FIGS. 8 and 10 are bottom views of part of the switching mechanism, showing positions of a first pivot shaft and a second pivot shaft altered by rotation of the riser.

With reference to FIGS. 2, 4, and 8, the switching mechanism 30 has a fixed seat 31, a controlling part 32, a lifting resilient element 33, a first rotation-fixing part 34, a second rotation-fixing part 35, at least one upright-fixing part 36, and at least one folded-fixing part 37.

The fixed seat 31 is mounted in the base 10. The fixed seat 31 has a fold recess 41, two side surfaces 414, a main fixing surface 415, an auxiliary fixing surface 416, a first locking recess 42, and a second locking recess 43. The fixed seat 31 is preferably assembled by a housing 311 and a bottom cover 312.

Figure 7:
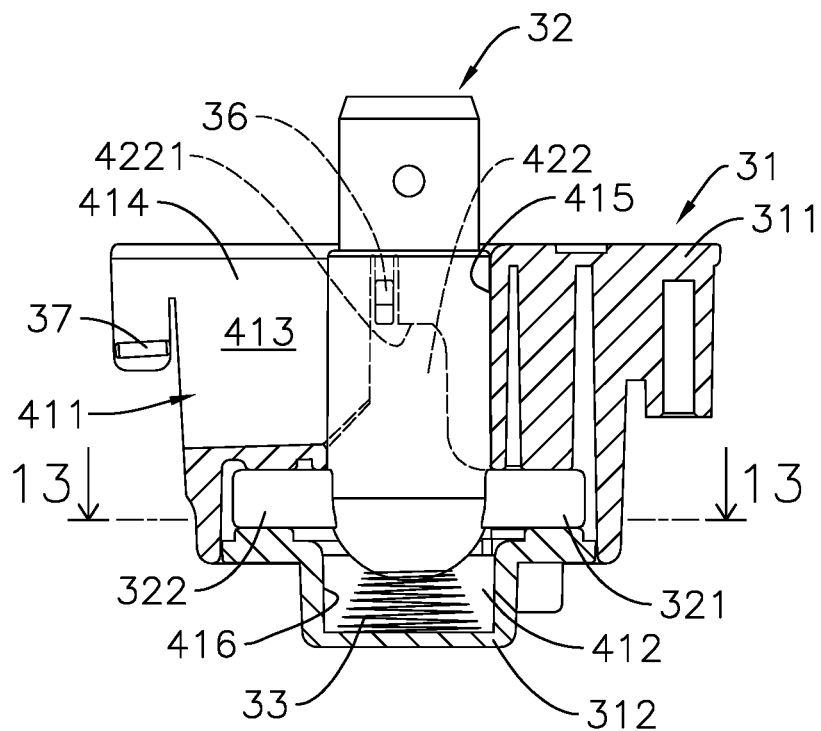
FIGS. 7, 9, 11, and 12 are longitudinal sectional views of part of a switching mechanism of the foldable stand in FIG. 1, showing the switching mechanism switching from a locked status to a released status, wherein FIGS. 11 and 12 showing a controlling part pivoting relative to a base in the released status.

With reference to FIGS. 4, 7, and 8, the fold recess 41 is formed in a top surface of the fixed seat 31 and is elongated. The fold recess 41 has an inner end and an outer end that are disposed oppositely. The outer end of the fold recess 41 forms a fold opening 411 on a side of the fixed seat 31.

In the preferred embodiment, the inner end of the fold recess 41 extends downward to form a descending section 412; that is, the fold recess 41 is substantially an L-shaped recess which comprises a transverse section 413 and a descending section 412. The transverse section 413 extends from the inner end to the outer end, and the descending section 412 is connected to the transverse section 413.

The two side surfaces 414 are formed in the fold recess 41 and are disposed oppositely. To be precise, the two side surfaces 414 are two opposite surfaces formed in the transverse section 413.

The main fixing surface 415 is formed in the inner end of the fold recess 41 and faces toward the fold opening 411. The main fixing surface 415 extends vertically to the descending section 412.

The auxiliary fixing surface 416 is formed in the descending section 412 and faces toward the main fixing surface 415; that is, the auxiliary fixing surface 416 and the main fixing surface 415 are disposed oppositely.

The first locking recess 42 is formed in the fold recess 41, and includes a first curved section 421 and a first ascending section 422. The first curved section 421 is formed in the main fixing surface 415 of the fold recess 41, and extends around the descending section 412 of the fold recess 41 to one of the two side surfaces 414. The first curved section 421 corresponds in height to the descending section 412; that is, the first curved section 421 is lower in height than the transverse section 413. The first curved section 421 has a first locking end 4211 located in the main fixing surface 415.

An end of the first ascending section 422 is connected to an end, which is located on said side surface 414, of the first curved section 421; another end of the first ascending section 422 extends upward to form a first releasing end 4221.

The second locking recess 43 is formed in the fold recess 41 and is disposed opposite to the first locking recess 42. To be precise, the second locking recess 43 is rotational symmetric to the first locking recess 42.

The second locking recess 43 has a second curved section 431 and a second ascending section 432.

The second curved section 431 is disposed opposite to the first curved section 421 of the first locking recess 42. The second curved section 431 is formed in the auxiliary fixing surface 416 in the fold recess 41, and extends around the descending section 412 of the fold recess 41 to another one of the two side surfaces 414. The second curved section 431 corresponds in height to the descending section 412; that is, the second curved section 431 is lower in height than the transverse section 413. An end, disposed in the auxiliary fixing surface 416, of the second curved section 431 is defined as a second locking end 4311.

The second ascending section 432 is disposed opposite to the first ascending section 422 of the first locking recess 42. An end of the second ascending section 432 is connected to an end, which is located on the corresponding side surfaces 414, of the second curved section 431; another end of the second ascending section 432 extends upwards to form a second releasing end 4321.

The controlling part 32 is connected to a lower end of the riser 20; to be precise, the controlling part 32 is fixed to the lower end of the riser 20. The controlling part 32 is mounted in the inner end of the fold recess 41 of the fixed seat 31.

A first pivot shaft 321 and a second pivot shaft 322 are protruded from the controlling part 32, and are disposed oppositely. The first pivot shaft 321 and the second pivot shaft 322 are blocks that have the function as shafts. The first pivot shaft 321 is slidably mounted in the first locking recess 42 of the fixed seat 31; the second pivot shaft 322 is slidably mounted in the second locking recess 43 of the fixed seat 31.

Figure 12:
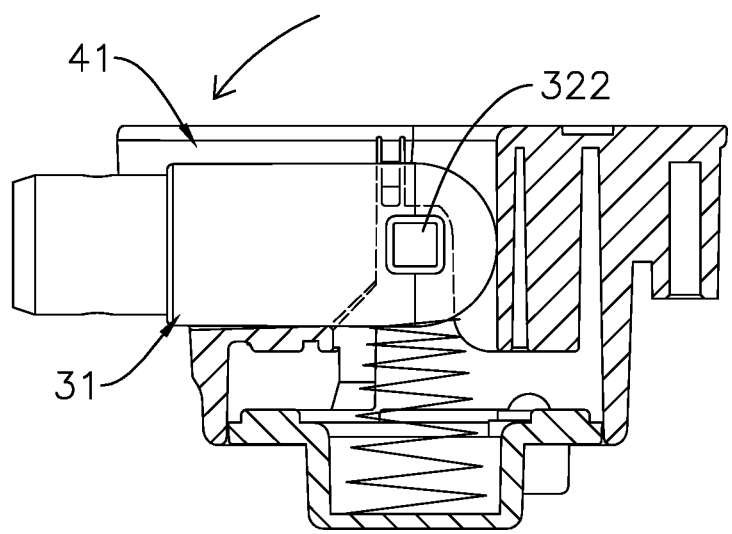

Positions of the first pivot shaft 321 and the second pivot shaft 322 are altered by rotation and linear motion of the riser 20 to switch the switching mechanism 30 from the locked status (as shown in FIGS. 4, 7, and 8) to the released status (as shown in FIG. 12).

The lifting resilient element 33 is mounted in the descending section of the fold recess 41 and drives the controlling part 32 to move upward. To be specific, the lifting resilient element 33 is a helical compression spring, and diameter of the lifting resilient element 33 reduced from one end of the lifting resilient element 33 to another end such that the lifting resilient element 33 is conical. When compressed, the lifting resilient element 33 can be compressed to a flat plate, thereby requiring less space than spherical compression spring. As a result, thickness of the base 10 can be reduced.

With reference to FIGS. 4, 7, and 8, in the locked status, the first pivot shaft 321 is disposed in the first locking end 4211 of the first locking recess 42, while the second pivot shaft 322 is disposed in the second locking end 4311 of the second locking recess 43 to fix the riser 20 in the upright position.

To be specific, in the locked status, the first pivot shaft 321 and the second pivot shaft 322 together substantially form an elongated shaft extending along the transverse section 413, and two opposite ends of the elongated shaft are inserted into two opposite walls of the fold recess 41 such that the controlling part 32 can only pivot around the elongated shaft. However, the controlling part 32 is clamped by the two side surfaces 414 such that the controlling part 32 cannot pivot around said elongated shaft. As a result, the controlling part 32 is substantially fixed to the fixed seat 31, and the riser 20 is fixed in the upright position.

Figure 6:
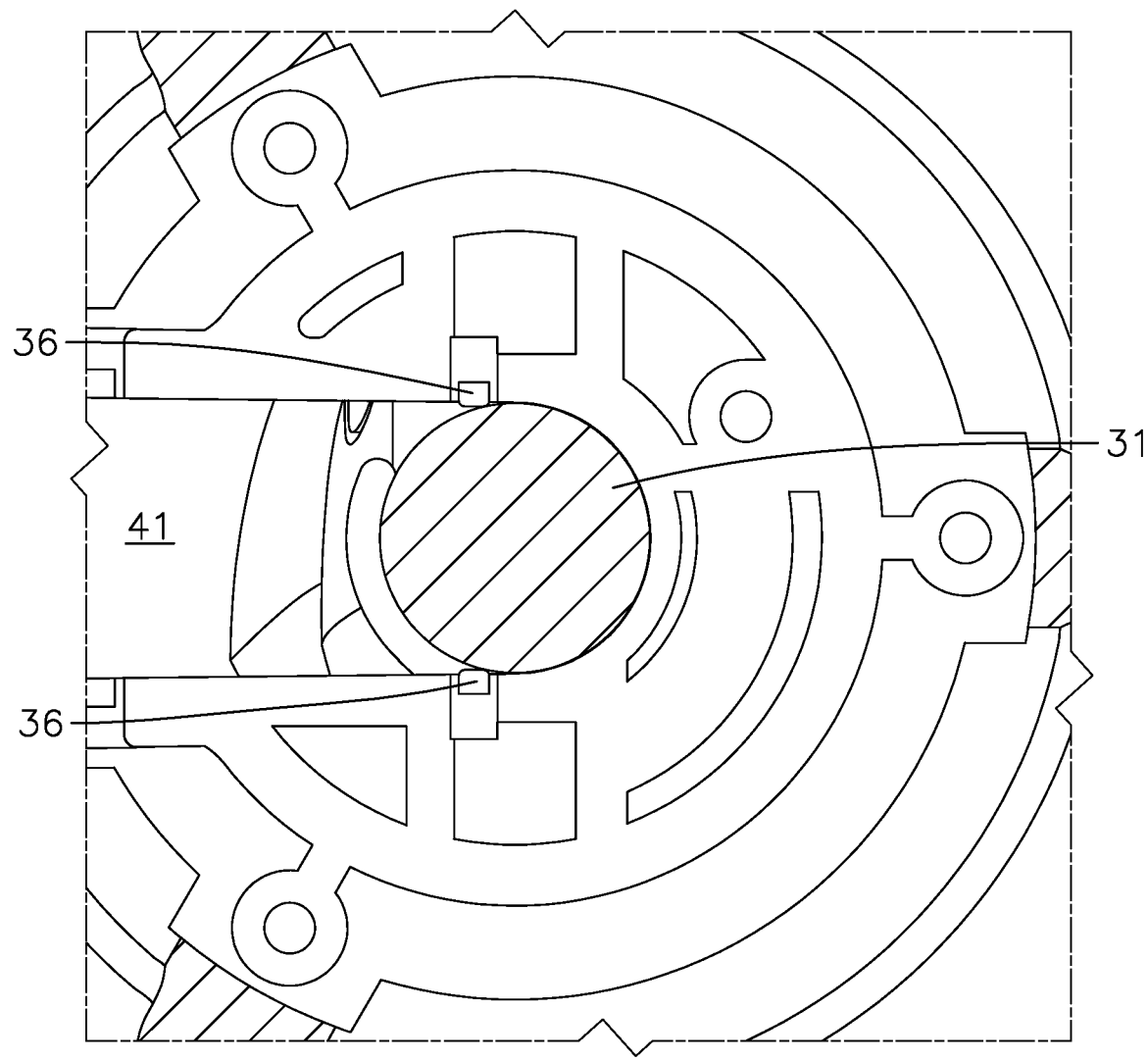
FIG. 6 is a sectional view of part of the foldable stand along cutting plane line 6-6 in FIG. 5, showing upright-fixing parts entering into an inner end of a fold recess and abutting against the riser to keep the riser in the upright position.

With reference to FIGS. 4, 6, and 7, a number of the upright-fixing parts 36 is preferably two. The two upright-fixing parts 36 are disposed in the fixed seat 31 and tend to enter into the inner end of the fold recess 41. To be specific, each upright-fixing part 36 is a bump formed on a distal end of an elastic beam of the fixed seat 31. When the riser 20 is in the upright position, the two upright-fixing parts 36 enter into the inner end of the fold recess 41 and abut an outer annular surface of the riser 20 to keep the riser 20 in the upright position.

Figure 13:
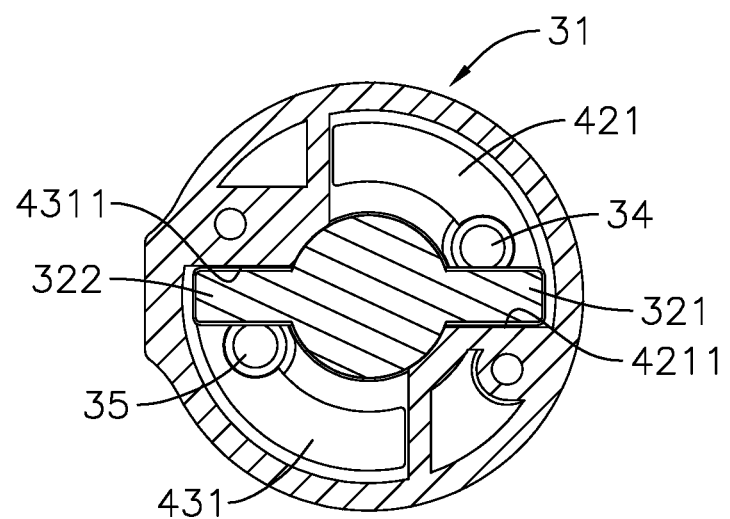
FIG. 13 is a sectional view along cutting plane line 13-13 in FIG. 7.

With reference to FIGS. 7 and 13, the first rotation-fixing part 34 is mounted on the bottom cover 312 of the fixed seat 31. The first rotation-fixing part 34 tends to enter into the first locking recess 42 and abuts against the first pivot shaft 321 of the controlling part 32 to keep the first pivot shaft 321 in the first locking end 4211.

The second rotation-fixing part 35 is mounted in the bottom cover 312 of the fixed seat 31. The second rotation-fixing part 35 tends to enter into the second locking recess 43 and abut against the second pivot shaft 322 of the controlling part 32 to keep the second pivot shaft 322 in the second locking end 4311 (as shown in FIG. 13). The first rotation-fixing part 34 and the second rotation-fixing part 35 are metal balls pushed upward by hidden springs.

Figure 9:
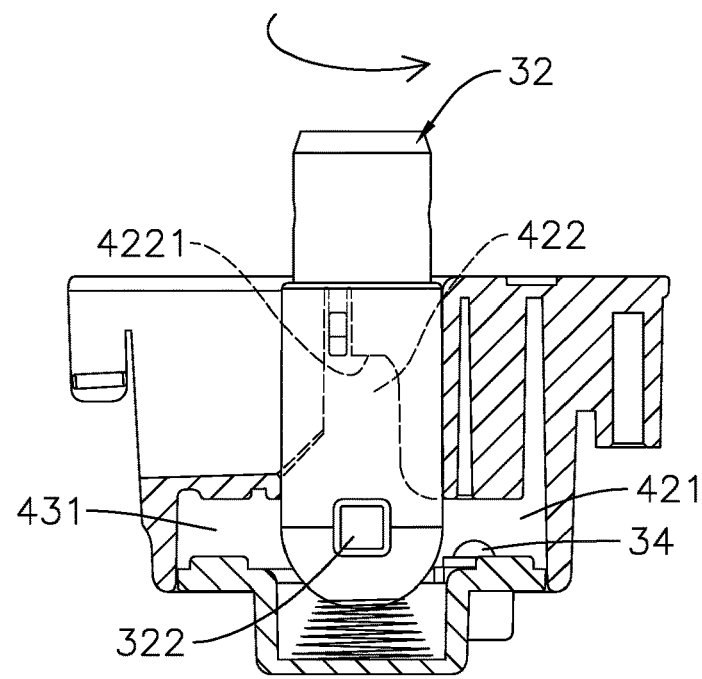
Figure 10:
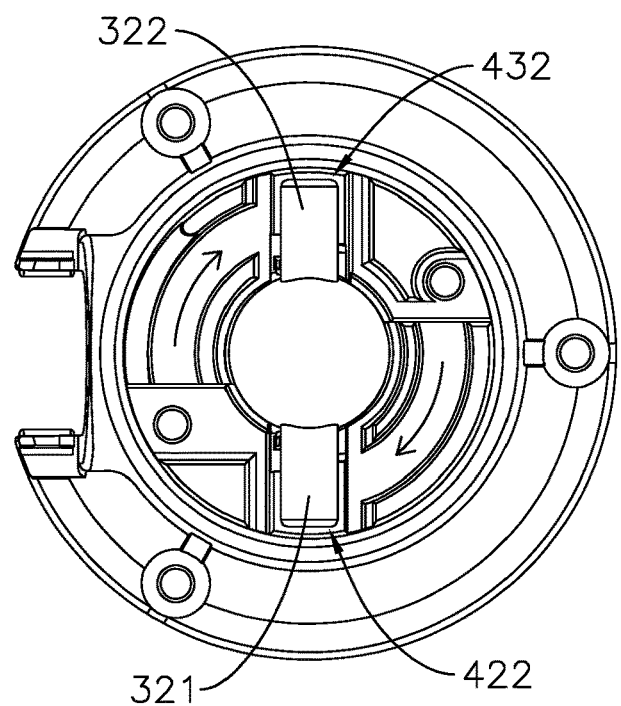
Figure 11:
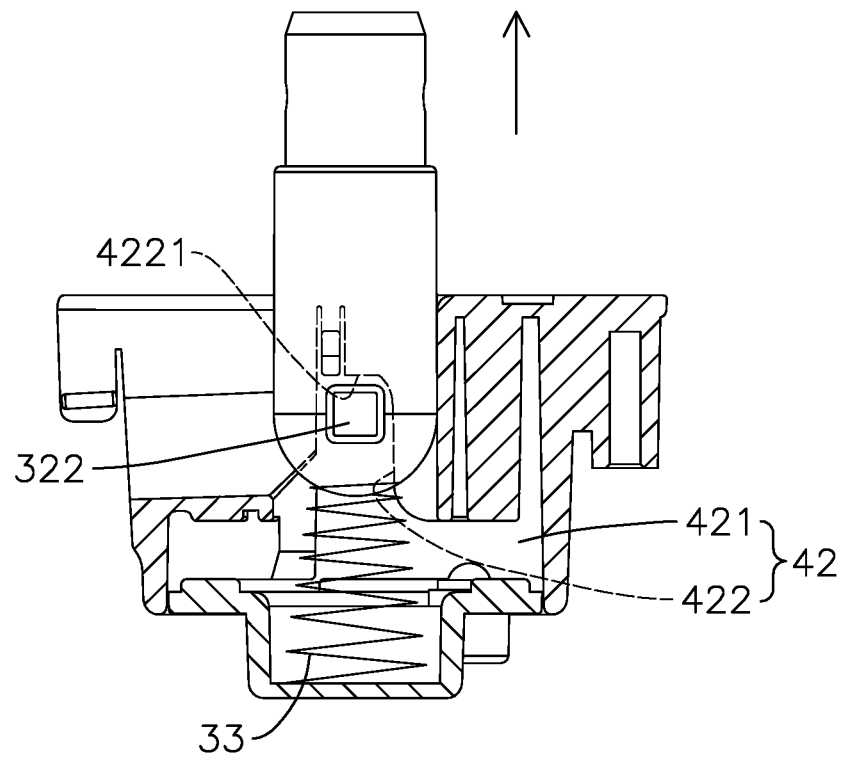

With reference to FIGS. 7 to 11, to switch the switching mechanism 30 from the locked status (as shown in FIGS. 7 and 8) to the released status (as shown in FIG. 11), first rotate the riser 20 on its centerline such that the controlling part 32 is rotated with the riser 20 to move the first pivot shaft 321 from the first locking end 4211 to a position where the first curved section 421 and the first ascending section 422 are connected (as shown in FIGS. 9 and 10); meanwhile, the second pivot shaft 322 is also moved from the second locking end 4311 to a position where the second curved section 431 and the second ascending section 432 are connected.

Then, the controlling part 32 is driven by the lifting resilient element 33 to move upward such that the first pivot shaft 321 automatically moves along the first ascending section 422 to the first releasing end 4221; meanwhile, the second pivot shaft 322 is also moved upward along the second ascending section 432 to the second releasing end 4321 (as shown in FIG. 8). Now the switching mechanism 30 has been switched to the released status.

With reference to FIGS. 11 and 12, in the released status, the first pivot shaft 321 is in the first releasing end 4221 of the first locking recess 42; meanwhile, the second pivot shaft 322 is in the second releasing end 4321 of the second locking recess 43 such that the riser 20 can pivot relative to the base 10 on the first pivot shaft 321 and the second pivot shaft 322.

To be specific, in the released status, the first pivot shaft 321 and the second pivot shaft 322 together substantially form an elongated shaft which is perpendicular to the transverse section 413. As a result, the controlling part 32 is pivotal on the elongated shaft without interfering with recess walls of the fold recess 41. Therefore, the riser 20 is capable of pivoting relative to the base more than 80 degrees to the folded position.

In the preferred embodiment, the riser 20 is capable of pivoting relative to the base more than 90 degrees to the folded position. When the riser 20 is in the folded position, the riser 20 lays flat in the fold recess 41 and is mounted through the fold opening 411 of the fold recess 41.

Figure 15:
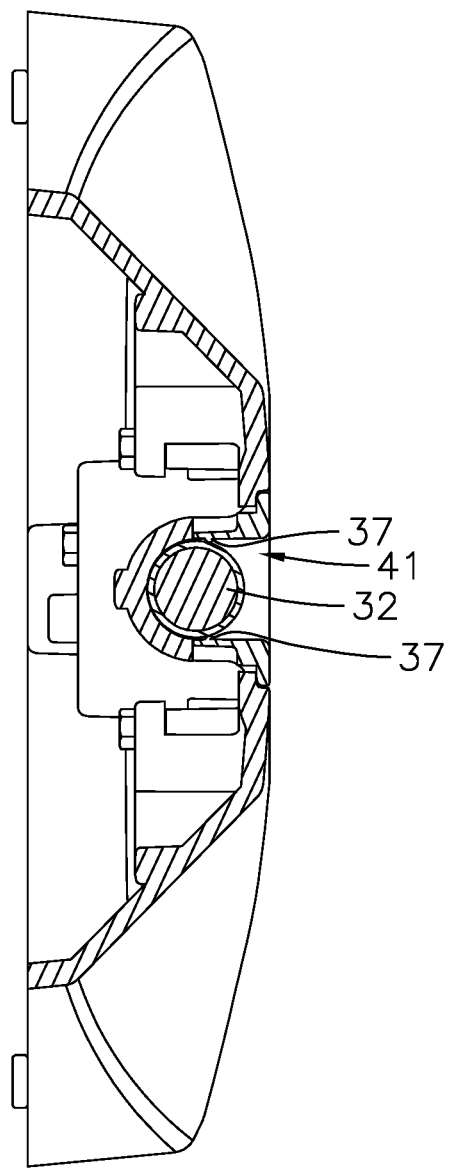
FIG. 15 is a sectional view along cutting plane line 15-15 in FIG. 14, showing two folded-fixing parts entering into an outer end of the fold recess and abutting the riser to keep the riser in the folded position.

With reference to FIGS. 4, 14, and 15, a number of the at least one folded-fixing part 37 is two. The two folded-fixing parts 37 are disposed oppositely in the outer end of the fold recess 41, and the two folded-fixing parts 37 tend to enter into the outer end of the fold recess 41. When the riser 20 is in the folded position, the two folded-fixing parts 37 enter into the outer end of the fold recess 41 and abut against the riser 20 to keep the riser 20 in the folded position.

The foldable stand has a folded status in which the riser 20 is in the folded position and an imaginary extension line of the centerline of the riser 20 passes through the side-standing portion 11 of the base 10 such that the foldable stand is capable of standing on the ground with only the side-standing portion 11 contacting the ground, thereby greatly reducing storage space. The side-standing portion 11 is preferably a flat surface, but not limited thereto. In another preferred embodiment, the side-standing portion 11 includes several protrusions protruded from a side of the base 10 and contacting the ground.

The advantage of the foldable stand is that the inner end of the fold recess 41 extends downward to form the descending section 412; as a result, the auxiliary fixing surface 416 can be formed in the descending section 412, thereby forming the second locking recess 43, and the second pivot shaft 322 can be engaged in the second locking recess 43 to provide extra fixation for the controlling part 32 to fix the foldable stand in the upright position.

Figure 16:
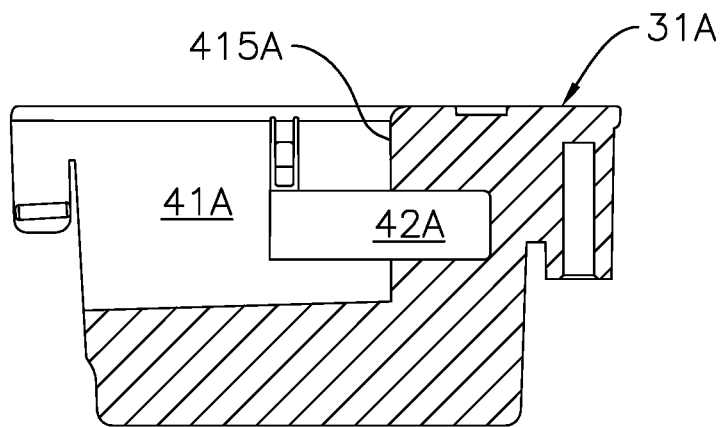
FIG. 16 is a longitudinal sectional view of a second embodiment of the foldable stand.

With reference to FIG. 16, a second embodiment of the present invention is substantially same as the first embodiment, but the main difference is that the inner end of the fold recess 41A does not extend downwards to form the descending section 412. As a result, the fixed seat 31A has the first locking recess 42A but lacks the second locking recess 43. Moreover, the first locking recess 42A does not have the first ascending section 422; the first locking recess 42A is formed in the main fixing surface 415 A of the fold recess 41A and extends to one of the side surfaces 414. Because the fixed seat 31A does not have the second locking recess 43, the controlling part does not have the second pivot shaft.

Due to lack of the first ascending section 422, when switching from the locked status to the released status, the controlling part 32 of the switching mechanism 30 does not move along the centerline of the riser 20, rotation of the riser 20 alone is sufficient to switch the status of the switching mechanism 30.

In summary, by connecting the base 10 and the riser 20 using the switching mechanism 30, the present invention has the following advantages: First, the foldable stand can be folded up by pivoting the riser 20 toward the base 10, reducing floor space required for storage significantly. As a result, the foldable stand is convenient for storage. Second, the switching mechanism 30 needs to be unlocked before pivoting the riser 20, preventing the riser 20 from accidentally pivoting toward the base 10. Third, the switching mechanism 30 is switched by rotating the riser 20, meaning the user does not have to squat down to operate the switching mechanism 30. As a result, the foldable stand is easy to use.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A foldable stand comprising:
a base;
a riser located on the base; and
a switching mechanism connecting the base and the riser such that the riser selectively pivots relative to the base from an upright position to a folded position; the switching mechanism having a locked status and a released status; in the locked status, the switching mechanism preventing the riser from pivoting relative to the base; in the released status, the switching mechanism allowing the riser to pivot relative to the base from the upright position to the folded position;
wherein the switching mechanism has
a fixed seat mounted in the base and having a fold recess being elongated and formed in a top surface of the fixed seat; the fold recess having an inner end and an outer end that are disposed oppositely; the outer end of the fold recess forming a fold opening on a side of the fixed seat; the inner end of the fold recess extending downward to form a descending section;

two side surfaces oppositely formed in the fold recess;

a main fixing surface formed in the inner end of the fold recess and facing toward the fold opening;

an auxiliary fixing surface formed in the descending section of the fold recess and facing toward the main fixing surface; and a first locking recess formed in the fold recess and having a first curved section formed in the main fixing surface of the fold recess and extending around the descending section of the fold recess to one of the two side surfaces; the first curved section corresponding in height to the descending section and having a first locking end located in the main fixing surface; and a first ascending section; an end of the first ascending section connected to an end, which is located on said side surface, of the first curved section; another end of the first ascending section extending upward to form a first releasing end; and a controlling part connected to a lower end of the riser, mounted in the inner end of the fold recess of the fixed seat, and having a first pivot shaft protruded from the controlling part and slidably mounted in the first locking recess of the fixed seat;

in the locked status, the first pivot shaft is located in the first locking end of the first locking recess to fix the riser in the upright position;

in the released status, the first pivot shaft is located in the first releasing end of the first locking recess such that the riser is pivotal relative to the base about the first pivot shaft; and when the riser is in the folded position, the riser is mounted in the fold recess and mounted through the fold opening of the fold recess.

2. The foldable stand as claimed in claim 1, wherein the fixed seat has a second locking recess formed in the fold recess and disposed opposite to the first locking recess; the second locking recess has a second curved section disposed opposite to the first curved section of the first locking recess; the second curved section formed in the auxiliary fixing surface of the fold recess and extending around the descending section of the fold recess to another one of the two side surfaces; the second curved section corresponding in height to the descending section and having a second locking end located in the auxiliary fixing surface;

a second ascending section disposed opposite to the first ascending section of the first locking recess; an end of the second ascending section connected to an end, which is located on said another side surface, of the second curved section; another end of the second ascending section extending upward to form a second releasing end;

the controlling part has a second pivot shaft protruded from the controlling part and disposed opposite to the first pivot shaft; the second pivot shaft slidably mounted in the second locking recess of the fixed seat;

wherein in the locked status, the first pivot shaft is located in the first locking end of the first locking recess, and the second pivot shaft is located in the second locking end of the second locking recess to fix the riser in the upright position together; and in the released status, the first pivot shaft is located in the first releasing end of the first locking recess, and the second pivot shaft is located in the second releasing end of the first locking recess such that the riser is pivotal relative to the base about an imaginary connecting line passing through the first pivot shaft and the second pivot shaft.

3. The foldable stand as claimed in claim 1, wherein the switching mechanism has a lifting resilient element which is mounted in the descending section of the fold recess and drives the controlling part to move upward.

4. The foldable stand as claimed in claim 2, wherein the switching mechanism has a lifting resilient element which is mounted in the descending section of the fold recess and drives the controlling part to move upward.

5. The foldable stand as claimed in claim 1, wherein
the switching mechanism has a first rotation-fixing part; the first rotation-fixing part is disposed in the fixed seat and configured to enter into the first locking recess;

in the locked status, the first rotation-fixing part enters into the first locking recess and abuts against the first pivot shaft of the controlling part to keep the first pivot shaft in the first locking end.

6. The foldable stand as claimed in claim 2, wherein
the switching mechanism has a first rotation-fixing part; the first rotation-fixing part is disposed in the fixed seat and configured to enter into the first locking recess;

in the locked status, the first rotation-fixing part enters into the first locking recess and abuts against the first pivot shaft of the controlling part to keep the first pivot shaft in the first locking end.

7. The foldable stand as claimed in claim 1, wherein
the switching mechanism has at least one upright-fixing part; the at least one upright-fixing part is disposed in the fixed seat and configured to enter into the inner end of the fold recess;

when the riser is in the upright position, the at least one upright-fixing part enters into the inner end of the fold recess and abuts against the riser to keep the riser in the upright position.

8. The foldable stand as claimed in claim 2, wherein
the switching mechanism has at least one upright-fixing part; the at least one upright-fixing part is disposed in the fixed seat and configured to enter into the inner end of the fold recess;

when the riser is in the upright position, the at least one upright-fixing part enters into the inner end of the fold recess and abuts against the riser to keep the riser in the upright position.

9. The foldable stand as claimed in claim 1, wherein
the switching mechanism has at least one folded-fixing part; the at least one folded-fixing part is disposed in the fixed seat and configured to enter into the outer end of the fold recess;

when the riser is in the folded position, the at least one folded-fixing part enters into the outer end of the fold recess and abuts against the riser to keep the riser in the folded position.

10. The foldable stand as claimed in claim 2, wherein the switching mechanism has at least one folded-fixing part; the at least one folded-fixing part is disposed in the fixed seat and configured to enter into the outer end of the fold recess;
when the riser is in the folded position, the at least one folded-fixing part enters into the outer end of the fold recess and abuts against the riser to keep the riser in the folded position.

11. The foldable stand as claimed in claim 1, wherein the base has a side-standing portion disposed on a side of the base;
when the riser is in the folded position, an imaginary extension line of the centerline of the riser passes through the side-standing portion;
the foldable stand has a folded status; in the folded status, the foldable stand stands on the ground with only the side-standing portion contacting the ground.

12. The foldable stand as claimed in claim 1, wherein the foldable stand is a microphone stand.

\* \* \* \* \*